United States Patent [19]
Colburn

[11] Patent Number: 4,791,583
[45] Date of Patent: Dec. 13, 1988

[54] METHOD FOR GLOBAL BLENDING OF COMPUTER MODELED SOLID OBJECTS USING A CONVOLUTION INTEGRAL

[75] Inventor: Stephen Colburn, Eureka, Ill.

[73] Assignee: Caterpillar Inc., Peoria, Ill.

[21] Appl. No.: 45,653

[22] Filed: May 4, 1987

[51] Int. Cl.$^4$ .................... G09G 1/02; G06F 15/62
[52] U.S. Cl. ................................ 364/522; 364/512; 364/521; 340/729
[58] Field of Search ............... 364/518, 521, 512, 522; 340/703, 707, 721, 723, 729, 747

[56] References Cited

U.S. PATENT DOCUMENTS

| | | | |
|---|---|---|---|
| 4,475,104 | 10/1984 | Shen | 364/521 X |
| 4,609,917 | 9/1986 | Shen | 340/729 |
| 4,694,404 | 9/1987 | Meagher | 364/518 |

OTHER PUBLICATIONS

Potmesil, "Generating Octree Models of 3D Objects from Their Silhouettes in a Sequence of Images," vol. 40, Jan. 1987, pp. 1–29.
Frieder et al., "Back to Front Display of Voxel-Based Objects," IEEE CG&A, Jan. 1985, pp. 52–60.

*Primary Examiner*—Gary V. Harkcom
*Assistant Examiner*—H. R. Herndon
*Attorney, Agent, or Firm*—Terry D. Morgan; Robert E. Muir; Michael G. Fletcher

[57] ABSTRACT

A method for generating a plurality of points that lie on the surface of a blended solid model. These points are obtained from the unblended solid model by a numerical solution to a convolution integral, wherein the convolution integral includes a spherically symmetric blending function with a size responsive to the blend radius desired for each of one or more regions on the solid model. For example, the spherical blending function may possess a constant value everywhere inside a sphere of radius R, and a value of zero outside (here called a "hard sphere"), or it may be represented by other functions of the radial direction, more specifically, the gaussian bell curve, in which case it will be called a "gaussian sphere". The numerical solution to the convolution integral is performed iteratively by placing the blending sphere at a plurality of locations along each of a set of rays that are defined substantially normal to and intersecting the solid model surface. The location on each ray at which the convolution integral is equal to a preselected value is stored. These stored locations may be used directly, or they may be used to define a set of surfaces that interpolate the blended solid model.

19 Claims, 13 Drawing Sheets

METHOD FOR GLOBAL BLENDING OF COMPUTER MODELED SOLID OBJECTS USING A CONVOLUTION INTEGRAL

TECHNICAL FIELD

This invention relates generally to a method for generating a set of fillets and rounds (blended surfaces) for a computer modeled solid object and more particularly to the use of a convolution integral in an automated method for global blending.

BACKGROUND ART

In the field of computer aided design and manufacturing, geometric modeling systems, such as PADL-2 marketed by Cornell University are available for generating structurally complex three dimensional models. These models are normally constructed in a series of steps which include first developing a sharp edged dimensionally accurate solid model. Depending upon the complexity of the model, the time required to produce the solid model varies from hours to months. For example, a part of moderate complexity, such as a die model for a track link forging, requires approximately one month of experienced operator input to complete.

Secondly, it is necessary to replace the undesirable sharp edges and corners with blends of selected radii. This is particularly important when the model is a forging die. Forgings with sharp edges tend to have stress risers concentrated at the sharp edges and will resultantly have a greater likelihood of failure. Furthermore, the blended aspect improves the flow of hot metal as it assumes the shape imposed by the die. Presently available systems typically accomplish blending as a local modification operation requiring extensive user input. In the track link forging example, this local blending process required nearly three months of operator input. Further, system vendor attempts to partially automate the local blending process have not been entirely successful.

There is a practical limit to the complexity of the model which can be blended using local modification methods. In automated local modification methods, the junction of multiple edges must be treated by example. The method must specifically address how the junction should appear for each variation in number of edges, angle between edges, and blend radius. The variety of corners and other detail is readily apparent and any attempt to treat all possible combinations would prove to be impractical.

The present invention is directed to overcoming one or more of the problems as set forth above. In particular, a method of global blending which reduces the need for user interaction and is not subject to limitations in model complexity is desirable.

DISCLOSURE OF THE INVENTION

In one aspect of the present invention, a method is provided for generating a set of blended surfaces for a computer representation of a solid model having a set of curvilinear surfaces. The method comprises the steps of: assigning a blend radius to the solid model; offsetting the curved surfaces of the solid model; defining a plurality of rays substantially normal to and intersecting the solid model surface; repetitively solving a convolution integral in an iterative manner at a plurality of locations along each ray, wherein the convolution integral includes a hard sphere blending factor with a radius equal to the blend radius assigned to the solid model; and storing the location on each ray at which the convolution integral is equal to a preselected value, said stored locations defining the set of blended surfaces of the solid model.

In another aspect of the present invention, a method is provided for generating a set of blended surfaces for a computer representation of a solid model having a set of curvilinear surfaces. The method comprises the steps of: offsetting the curved surfaces of the solid model; generating an octree representation of the solid model; generating a complementary octree representation of the volume outside the solid model; assigning blend radius values to each individual cell of the octree; defining a plurality of rays substantially normal to and intersecting the solid model surface; repetitively solving a convolution integral in an iterative manner at a plurality of locations along each ray, wherein the convolution integral includes a gaussian sphere blending factor with a size responsive to the blend radius assigned to the octree cell; and storing the location on each ray at which the solution of the convolution integral is equal to a preselected value, said stored locations defining the set of blended surfaces of the solid model.

Geometric modeling systems are known which are capable of performing partially automated blending processes using local blending modifications. However, these systems require extensive user interaction, and/or are limited by the complexity of the model.

BEST MODE FOR CARRYING OUT THE INVENTION

Figure 1:
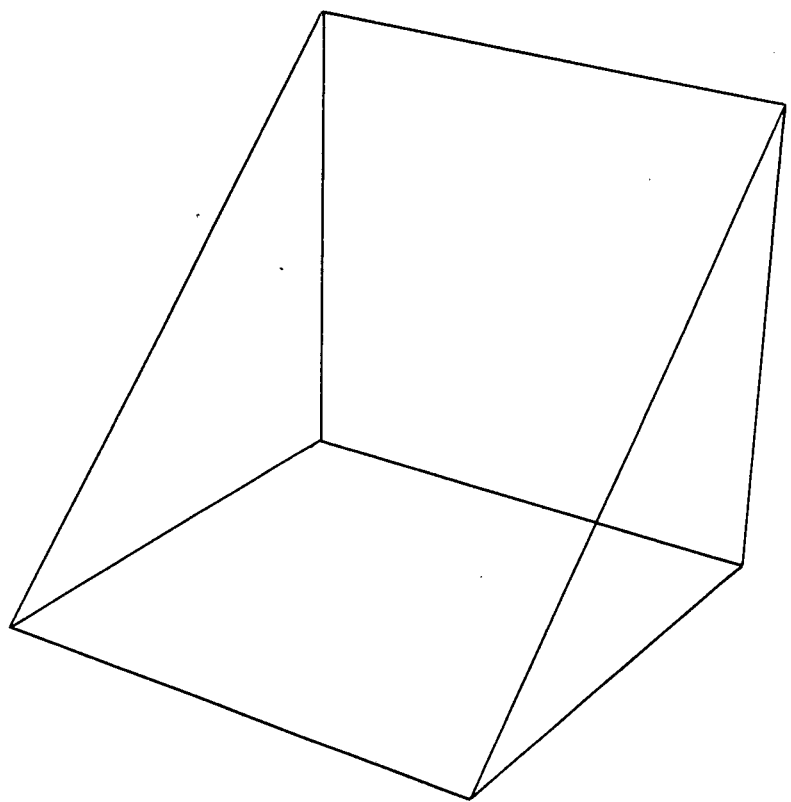
FIG. 1 illustrates a solid model of a simple three dimensional triangular prism.

Referring now to the drawings, wherein a preferred embodiment of the present apparatus 10 is shown, FIG. 1 illustrates a relatively simple solid model representation of a triangular prism 12. Such a model is typically generated by an operator at a console and is the first step with a computer aided design and manufacturing (CAD/CAM) system. One desirable end result of a useful CAD/CAM system is a solid model from which a set of cutting tool paths can be automatically derived to physically reproduce the model from rough stock. However, in a manufacturing environment, it is commonly necessary to produce parts which not only have the sharp edges of the prism 12, but have the more complicated blended corners of preselected radii. One can readily appreciate that generating a model bounded by a set of intersecting planes, as shown in FIG. 1, is considerably simpler than developing a model of the same prism 12 with rounded edges. The method described herein allows the operator to generate the simpler sharp edged models and automatically create a blended model with rounded edges.

Figure 2A:
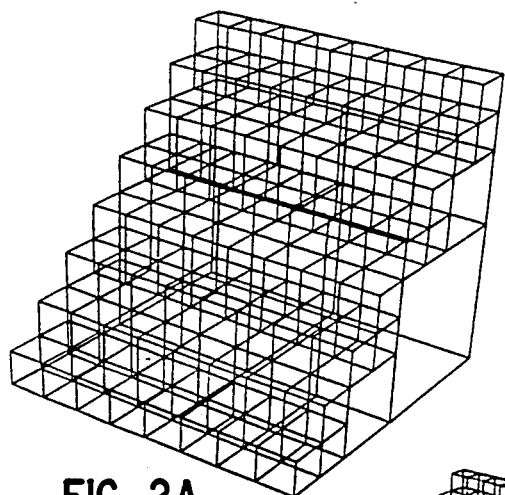
FIG. 2a illustrates an octree representations of a three dimensional triangular prism.
Figure 2B:
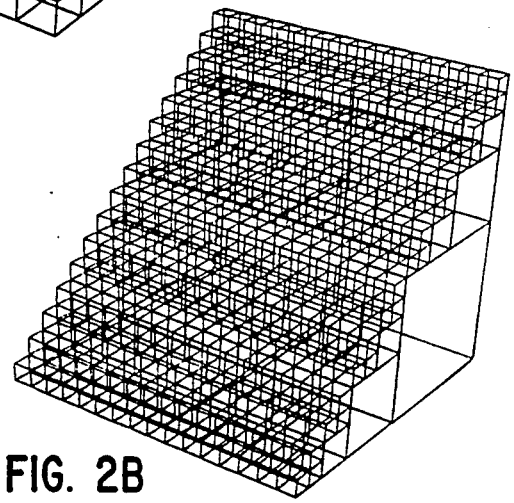
FIG. 2b illustrates an octree representations of a three dimensional triangular prism.
Figure 2C:
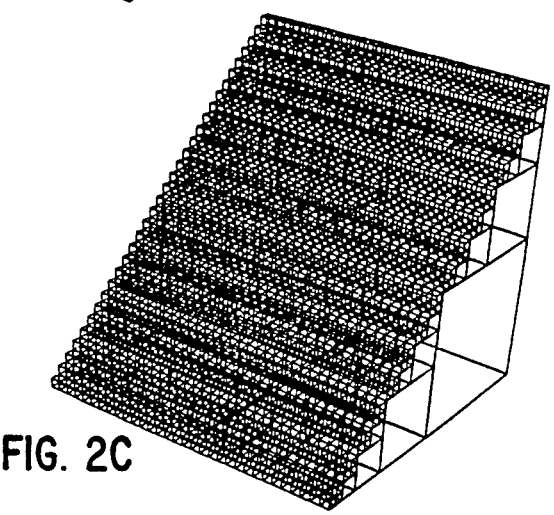
FIG. 2c illustrates an octree representations of a three dimensional triangular prism.

When a gaussian sphere is placed at a given location, the convolution integral can be solved in closed form if the solid model has a reasonably simple form. A solid model with any degree of geometrical complexity can be subjected to a closed form solution of the convolution integral if the unblended model is first approximated by a set of sufficiently small rectangular blocks or cubes. One such approximation is known as an octree representation. The second step in the global blending system is illustrated in FIGS. 2a, 2b, and 2c and involves generating the octree representation of the solid model to a preselected minimum cell size. Three such octree representations are shown in FIGS. 2a, 2b, and 2c. For example, the octree begins with a single cube large enough to encompass the entire prism and is then divided into octants (eight identical cubes). The cubes completely outside the prism 12 are discarded. The cubes entirely within the prism 12 are retained and will not be further subdivided. Only those cubes which intersect the prism 12 boundary are further subdivided into smaller octants. This process continues recursively for a preselected number of iterations which is indicative of a minimum cell size. The three octree representations shown in FIGS. 2a, 2b, and 2c respectively illustrate levels, or iterations, of 3, 4 and 5 having minimum cell sizes of 16, 8 and 4 units, respectively.

Figure 3A:
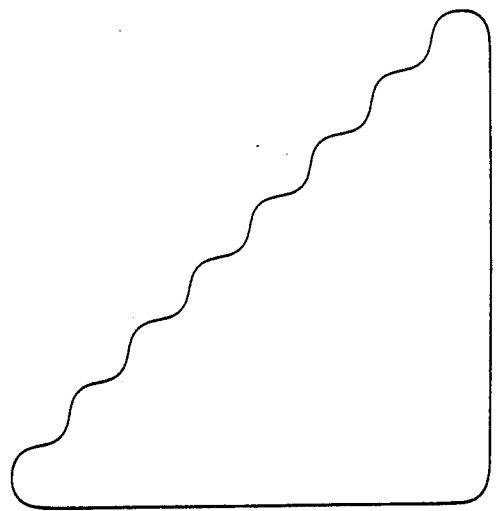
FIG. 3a illustrates a cross-section of a blended three dimensional triangular prism.
Figure 3B:
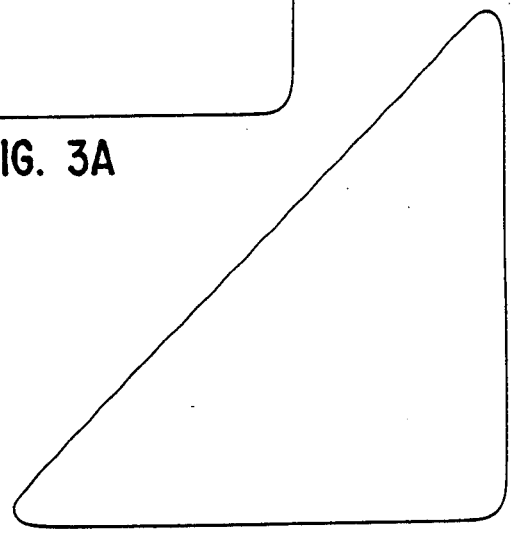
FIG. 3b illustrates a cross-section of a blended three dimensional triangular prism.
Figure 3C:
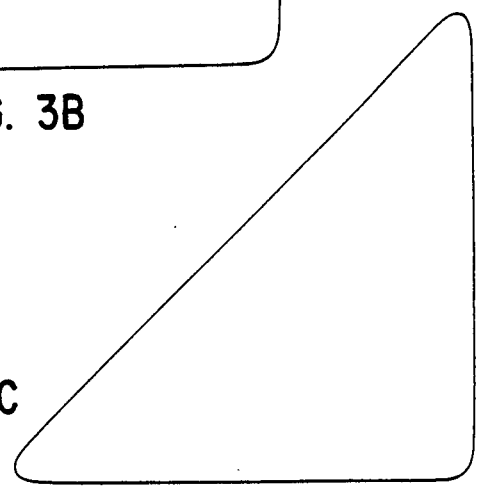
FIG. 3c illustrates a cross-section of a blended three dimensional triangular prism.

The minimum cell size is selected based on two criteria. First, the minimum cell size must be less than one-half of the value of the applied blend radius. If this criterion is not met, then the stairstep shape provided by the octree approximation will remain apparent in the blended model. This is illustrated in FIG. 3a, 3b, and 3c, where a blend radius of 8 units has been applied in each of the 3 cross-sections shown. In the first case, the step size is twice the blend radius, while in the second, the step size is equal to the blend radius, with both cases exhibiting a waviness along the diagonal face. In the third case, the cell size criterion has been met, with a step size one half the blend radius. The waviness here is negligible being less than one-fiftieth of that shown in the second case.

The other criterion determining the choice of minimum cube size is related to the precision with which the resulting octree approximates the shape of the original unblended model. Obviously, this precision is improved by a factor of two each time the minimum cube size is halved, but memory available to store the resulting octree would be depleted long before a precision sufficient to satisfy common manufacturing tolerances is met. A solution to this problem is obtained by assigning a weighting factor to each of the minimum sized cubes that is intersected by the boundary of the original unblended solid model. This weighting factor indicates the fraction of the volume of the cube that is inside the unblended solid. By taking into account these weights when the convolution integral is evaluated, surfaces in the blended model can be produced that follow those of the unblended model to within about two percent of the minimum cell size. For example, if the manufacturing profile tolerance is given as plus or minus 0.1 millimeter, then the minimum cube size should be no larger than 5 millimeters.

A Monte Carlo technique is employed to calculate individual cell weights. For each boundary cell, a number of points are randomly generated with cartesian coordinates falling inside the cell. The solid modeler is then used to classify the points as being either inside or outside the solid model. The ratio of points inside the model to the total points is the weighting factor assigned to that cell. An increase in the number of test points per cell produces an increase in precision. The two percent figure stated above corresponds to about 20 test points per cell. This process is repeated for each boundary cell of the octree representation.

Figure 4:
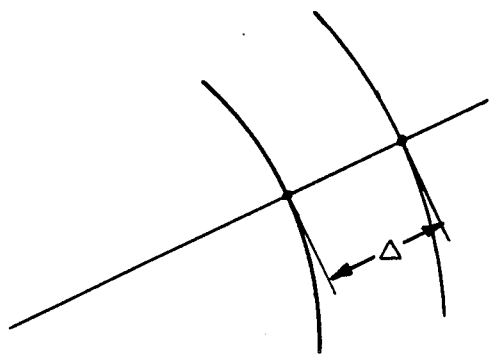
FIG. 4 illustrates one embodiment of a method for applying weights to individual octree cells.
Figure 5:
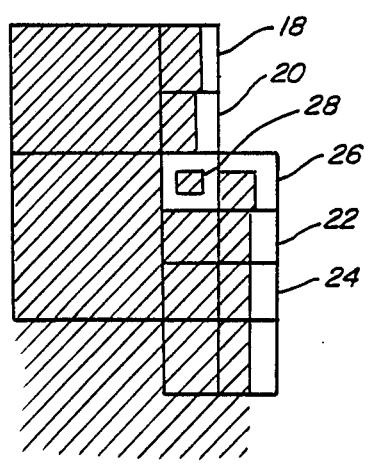
FIG. 5 illustrates another embodiment of a method for applying weights to individual octree cells.

Two alternative methods of interpreting the weighting factors are respectively illustrated in FIGS. 4 and 5. The first method, illustrated in FIG. 4 relies on modification of the resulting blended surface on a point by point basis. To accomplish this, a surface point on the blended model is first found by using the ray trace method to be explained later, but with all octree weights set to unity. This point is then moved inwards along the ray by an amount indicated by a local average of the octree weights, where this average is taken over a region the size of the blending radius.

Conversely, the second weighting method, illustrated in FIG. 5, modifies the actual octree representation of the solid model. The size of each individual boundary octree cell is altered responsive to the respective weighting factor. Boundary cells with at least one exposed face are altered by moving each exposed surface in a direction toward the opposite parallel surface a distance responsive to the assigned weighting factor. For example, the cells 18, 20, 22, 24 have a single exposed face with weighting factors of 0.7, 0.5, 0.4, and 0.4 respectively. The shaded portions of these cells reflect the altered octree. Similarly, the cell 26 has a pair of exposed faces and a weighting factor of 0.5. Each of the exposed faces is moved in a direction toward the opposite parallel face such that the resulting volume is equal to one-half of the original. This rule can be expanded to apply to any cell with multiple exposed surfaces.

In the case where a cell 28 intersects the boundary of the solid model, but has no exposed surface, the cell size is altered by uniformly reducing the volume of the cell about the center of the cell correlative to the assigned weighting factor. For example, the cell 28 has no exposed surfaces and a weighting factor of 0.5; consequently, each surface is moved in a direction toward the opposite parallel surface to provide a cell with the same center point as the original cell, but a volume of one-half the volume of the original cell. Since the blending radius is at least twice the size of a cell, several cells contribute to the evaluation of the convolution integral at any given point, and small errors in the weighting factor for individual cells tend to average out.

Figure 6:
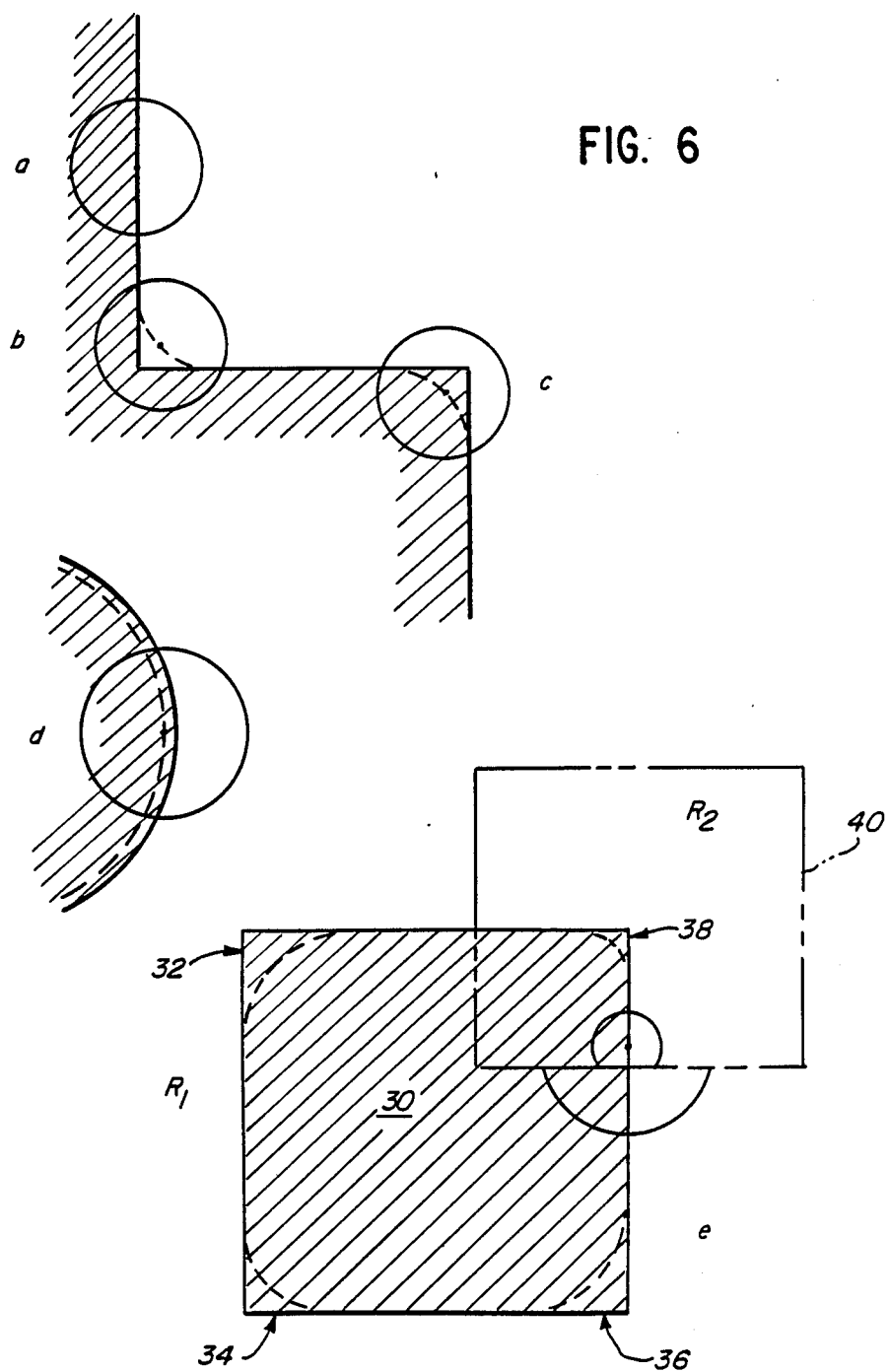
FIG. 6 illustrates an embodiment of a method for solving the convolution integral.

A discussion of two additional issues regarding the precision of the blended model requires a closer examination of the convolution process, which is described in five special cases, as illustrated in FIGS. 6a–6e. In FIG. 6a, the blending sphere is shown in correct position for a flat surface. One half of the volume of the sphere is inside the object, and one half outside. The center point of the sphere defines a point on the boundary of the blended model. In FIGS. 6b and 6c, respectively, the blending sphere is shown in the vicinity of a corner of the original unblended model, the first being concave and the second convex. Once again, these spheres are shown with one half of its volume inside and the other half outside the original unblended model, and with the center point of the sphere, in each case, giving a point on the blended model. FIGS. 6b and 6c suggest the basic blending mechanism, and can be applied to a model of any complexity. With this blending mechanism in mind, the first precision issue is examined, referring to it as the curvature affect. FIG. 6d shows the blending sphere applied to a solid with a cylindrical shape, where the radius of the unblended cylinder is larger than the blend radius, but not vastly so. It should be evident from the illustration that the condition of balance, with half of the sphere inside and half outside the unblended model does not leave the center of the sphere on the original surface, but slightly to the concave side. Thus, the process of blending the cylinder has the effect of shrinking it slightly. The same effect is found for other curved surfaces, and can be predicted based on a knowledge of the local curvature. For example, if a cylinder with radius of 100 millimeters is to be blended to a radius of 10 millimeters, the resulting shrinkage, or offset, is found to be about 0.15 millimeters. The offset varies with the square of the blend radius and with the inverse of the local curvature. This problem is solved by offsetting the curved faces of the original unblended model in the direction to oppose the shrinkage, this offsetting being accomplished before the octree is generated.

The second precision issue involves a model that has two or more blend radius values assigned to respective regions on the object. Referring to FIG. 6e, where it is desired to blend a block 30, such that three of the corners 32,34,36 shown in cross-section receive a blend radius of $R_1$ units, while the fourth corner 38 receives a blend radius of $R_2$ units. This condition is specified by first assigning $R_1$ to the block 30 as the default blend radius, then defining a region 40, here shown as a square drawn with phantom lines, and assigning a radius of $R_2$ to this region.

An analogous situation is found in the study of transient heat flow in a composite infinite media. The unblended model corresponds to an initial temperature distribution, while $R_1$ and $R_2$ denote differing heat conductivity values. The blended model is thought of as a constant temperature surface at a short time after $t=o$. We must be concerned about the surface of the blended model near the interface between the two blending radius regions. In the example shown, the blended surfaces here will remain flat if the blending radius region boundary crosses the boundary of the unblended model at essentially right angles, and if this region extends inward and outward from the original surface by a distance in excess of the larger of the two blend radii. This condition is illustrated in FIG. 6e where the blending sphere has been split at the blending radius region boundary, each part assuming the radius assigned to the respective region. In the octree approximation, a given cell belongs to one and only one region. Thus the region boundaries are also maintained by octree cells. Not only must there be an octree representation of the unblended object, but the octree must extend beyond the boundary of the object by a distance in excess of the local blend radius. The portion of the octree exterior of the object will be termed the complementary octree to distinguish it from the portion interior to the object.

A complementary octree is generated in a manner similar to generating the original octree by first creating a cube with the same center as the original octree cube, but twice the size (for example). The previously discarded octree cells are converted to complementary octree cells. Thereafter, each of the converted complementary octree cells which are partially exposed to the initial octree are recursively subdivided. Further, complementary octree cells which span regions of different blend radius are also recursively subdivided.

In the weighting method discussed previously where the boundary octree cells are reduced in size, the portions of the boundary octree cells vacated by the weighting process are defined as new complementary octree cells. This process ensures that all space within a preselected distance of the solid model boundary is explicitly defined as either inside or outside the solid model.

In an effort to logically and orderly select points for the boundary evaluation, a plurality of rays are defined substantially normal to and intersecting the solid model surface. Rather than select a very large number of points at random, a controlled method of selecting points can provide a much faster boundary evaluation without sacrifice to model accuracy. In the preferred embodiment, an operator manually defines rays with end points respectively inside and outside the boundary. Points on the ray are iteratively determined to be either inside or outside the boundary until a crossover is determined and must, therefore, be on the boundary. Concentration of the rays in areas of greater curvature helps to produce a boundary with sufficient detail. For example, on a plane surface, relatively few rays are needed as any three points can accurately reproduce the plane. However, on more complex surfaces, such as the junctions of multiple planes, more rays are needed to produce enough points to accurately describe the surface.

In practice the operation is currently manually accomplished by an operator defining a plurality of contiguous patches each bounded by a group of four rays. The operator will then input a desired number of rays to be included within each patch. The software will define the required number of intermediate rays uniformly distributed throughout the patch. The number of rays are left to operator discretion, but as a general rule complex curved surfaces require a much higher number of rays than a flat surface. While the definition of patches is currently manually performed by a skilled operator, it is recognized that this process could also be automated without departing from the spirit of the present invention.

The process of iteratively solving for the boundary of the solid model is here described in detail. First, the original unblended solid model is expressed as an implicit function:

$$f(x,y,z) = \begin{cases} 1 & \text{inside solid model boundary} \\ 0 & \text{on solid model boundary} \\ -1 & \text{outside solid model boundary} \end{cases}$$

It is a basic capability of any true solid modeling system to evaluate this function for any given model represented by such a system. That is, given a point (x,y,z) in space, the solid modeling system can determine if the point is inside, on, or outside the boundary of the object. In addition to the function f(x,y,z) that defines the unblended solid model, a function h(x,y,z) is needed, centered at the origin and defining the blending sphere. The contribution of the portions of the sphere that may be either inside and outside the unblended object is given by an integral g over the product of f and h:

$$g(x,y,z) = \iiint_{-\infty}^{\infty} f(x',y',z')h(x'-x, y'-y, z'-z)dx'dy'dz'$$

such that the blending sphere is now centered at the point where g is to be evaluated, and is known as a convolution integral.

The precise form of the blending sphere h must be specified if the integral g is to be evaluated. Two such forms are described, the hard sphere and the gaussian sphere. For the hard sphere, the function h assumes a positive constant value inside the spherical domain, and zero outside, while the value of h for the gaussian sphere varies, smoothly from some positive maximum value at the center of the sphere according to the gaussian function. In either case the function h is normalized according to:

$$\iiint_{-\infty}^{\infty} h(x,y,z)dxdydz = 1$$

so that the two forms are expressed as:

$$h(x,y,z)_{\text{sphere}} = \left(\frac{1}{\sqrt{\pi \alpha R}}\right)^3 e^{-(\frac{1}{\alpha R})2(x^2+y^2+z^2)} \quad \text{gaussian}$$

$$h(x,y,z) = \begin{cases} \frac{3}{4\pi R^3} & \text{inside} \\ 0 & \text{outside} \end{cases} \quad \text{hard sphere}$$

where:
R = blend radius
α = numerical constant.

In the case of the hard sphere, the convolution integral can be evaluated directly using a solid modeler that has the following functions:

1. Boolean intersection and difference of two solids;
2. Volume evaluation for a solid.

Thus, to evaluate g for a hard blending sphere at some given location, a solid corresponding to the portion of the sphere inside the unblended solid is obtained as the Boolean intersection of the solid and the sphere, while that portion of the sphere lying outside is obtained as the Boolean difference of the blending sphere and the solid. The volume of each resulting solid is obtained, then the value of g is obtained as the arithmetic difference of the value of the volume of the portion of the sphere found inside, and the volume of the remaining portion of the sphere.

Although a repeated application of these operations would produce a set of points on the blended object, the process would be slow. For this reason the object to be blended is first approximated as a set of cubes by the octree representation, then the integral g is repeatedly evaluated using the gaussian sphere for each cube and the results summed.

The convolution integral g can be written as the sum of an integral over each cell in an octree. Since an octree cell is either inside the object where f = 1, or outside where f = −1, two terms result:

$$g(x,y,z) =$$

$$\sum_{\substack{\text{inside} \\ \text{cube } i=1}}^{n} \iiint_{\text{cube } i} h(x'-x, y'-y, z'-z)dx'dy'dz' -$$

$$\sum_{\substack{\text{outside} \\ \text{cube } j=1}}^{m} \iiint_{\text{cube } j} h(x'-x, y'-y, z'-z)dx'dy'dz'$$

where the limits of integration are the boundaries of the octree cube currently being evaluated.

The solution to this equation for a specific cube may be useful in understanding the process as a whole. First, the cube being evaluated is defined as being located at $(X_c, Y_c, Z_c)$ and having side dimensions of 2s. To perform the integration it is necessary to define the limits of integration as the coordinates of the faces of the cube and to substitute the gaussian form of h.

$$g_{\text{cube}} = \int_{x'=x_c-s}^{x_c+s} \int_{y'=y_c-s}^{y_c+s} \int_{z'=z_c-s}^{z_c+s} \left(\frac{1}{\sqrt{\pi \alpha R}}\right)^3 e^{-(\frac{1}{\alpha R})2(x'-x)2+(y'-y)2+(z'-z)2} dx'dy'dz'$$

Thus, using the gaussian sphere, each of the three integrals are of the same form (separable) and it is only necessary to solve one and apply the solution to the remaining integrals.

$$H_x = \left(\frac{1}{\sqrt{\pi \alpha R}}\right) \int_{x_c-s}^{x_c+s} e^{-(\frac{1}{\alpha R})2(x'-x)2} dx'$$

substituting, $\frac{1}{\alpha R}(x'-x) = u$ then, $dx' = \alpha R du$

For the lower limit where $x' = x_c - s$, then $u = \frac{1}{\alpha R}(x_c - s + x)$ For the upper limit where $x' = x_c + s$, -continued then $u = \frac{1}{\alpha R}(x_c + s - x)$ The equation becomes:

$$Hx = \frac{1}{\sqrt{\pi}} \int_{\frac{1}{\alpha R}(x_c - s + x)}^{\frac{1}{\alpha R}(x_c + s - x)} e^{-u^2} du$$

by definition, the integral of $e^{-u^2}$ is called the "error function", erf(x), such that:

$$erf(x) = \frac{2}{\sqrt{\pi}} \int_0^x e^{-u^2} du$$

Using this definition $H_x$ can be further simplified:

$$H_x = \frac{1}{2}\left( erf\left(\frac{x - (x_c - s)}{\alpha R}\right) - erf\left(\frac{x - (x_c + s)}{\alpha R}\right) \right)$$

similarly, $$H_y = \frac{1}{2}\left( erf\left(\frac{y - (y_c - s)}{\alpha R}\right) - erf\left(\frac{y - (y_c + s)}{\alpha R}\right) \right)$$

and, $$H_z = \frac{1}{2}\left( erf\left(\frac{z - (z_c - s)}{\alpha R}\right) - erf\left(\frac{z - (z_c + s)}{\alpha R}\right) \right)$$

thus, $$g_{cube} = H_x H_y H_z$$

The result is a blended cube and the sum of all the cubes of the octree gives an implicit function representing the blended object.

Figure 7:
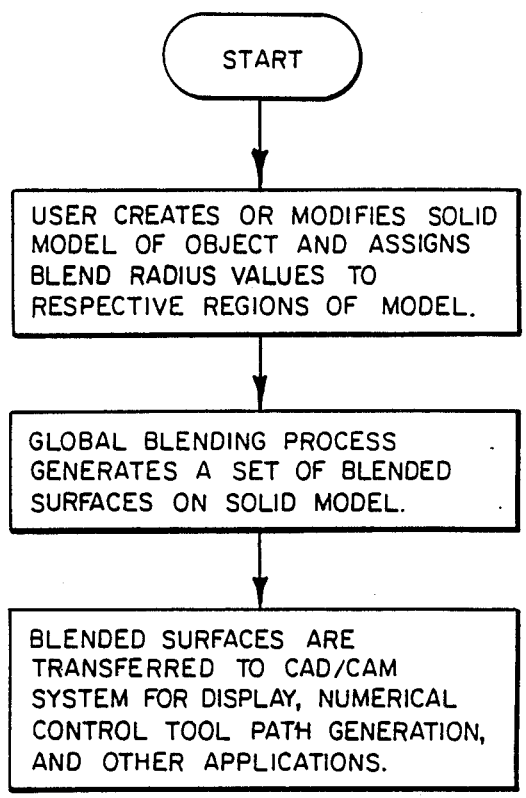
FIG. 7 illustrates a flow chart representation of an embodiment of a portion of the software.

Referring now to the flowcharts of FIGS. 7-10, a top level view of the process is shown in FIG. 7. The process begins with the user creating a new solid model or modifying an existing solid model using one of the commercially available solid modelers. Preferably, the solid modeler is PADL-2 marketed by Cornell University; however, other programs may be readily substituted. The product of the solid modeler is an unblended sharp edged model with the desired blend radius values assigned to the corresponding regions of the model as attributes. These regions are constructed, in fact, as solids of the type supported by the solid modeler.

Subsequently, the solid model is passed to the global blending program to produce a blended model. The radius of the edges correspond to the blend radius values assigned by the operator during the modeling process. A sculptured surface model is the result of this step.

Once the blended surfaces have been generated the model is transferred to a CAD/CAM system for display, numerical control tool path generation, and other applications. The program Anvil-4000 is preferably used to generate the machine tool paths; however, other CAD/CAM programs may be readily substituted. The machine tool paths, when applied to an NC programmable machine, result in a physical reproduction of the computer model of the piece part.

Figure 8:
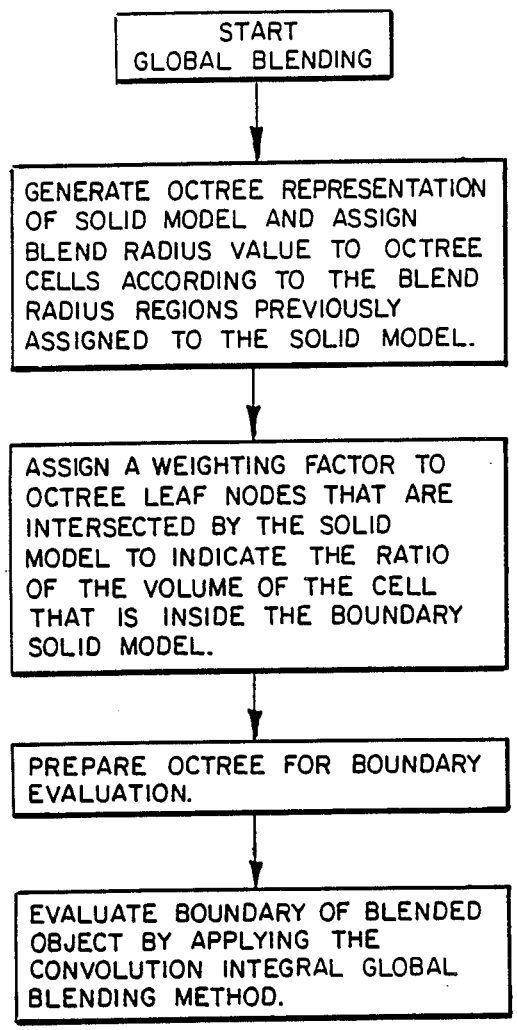
FIG. 8 illustrates a flow chart representation of an embodiment of a portion of the software.

The global blending process is described in greater detail in conjunction with the flowchart of FIG. 8. The process begins by generating the previously discussed octree representation of the solid model. Further, the blend radius values assigned during the solid modeling are assigned to the corresponding octree cells. The program first determines whether more than one blend radius value has been assigned to the model. Obviously, if the model is to be blended to a single radius then the program generates a straightforward octree and assigns the default blend radius to each of the octree cells.

Figure 9:
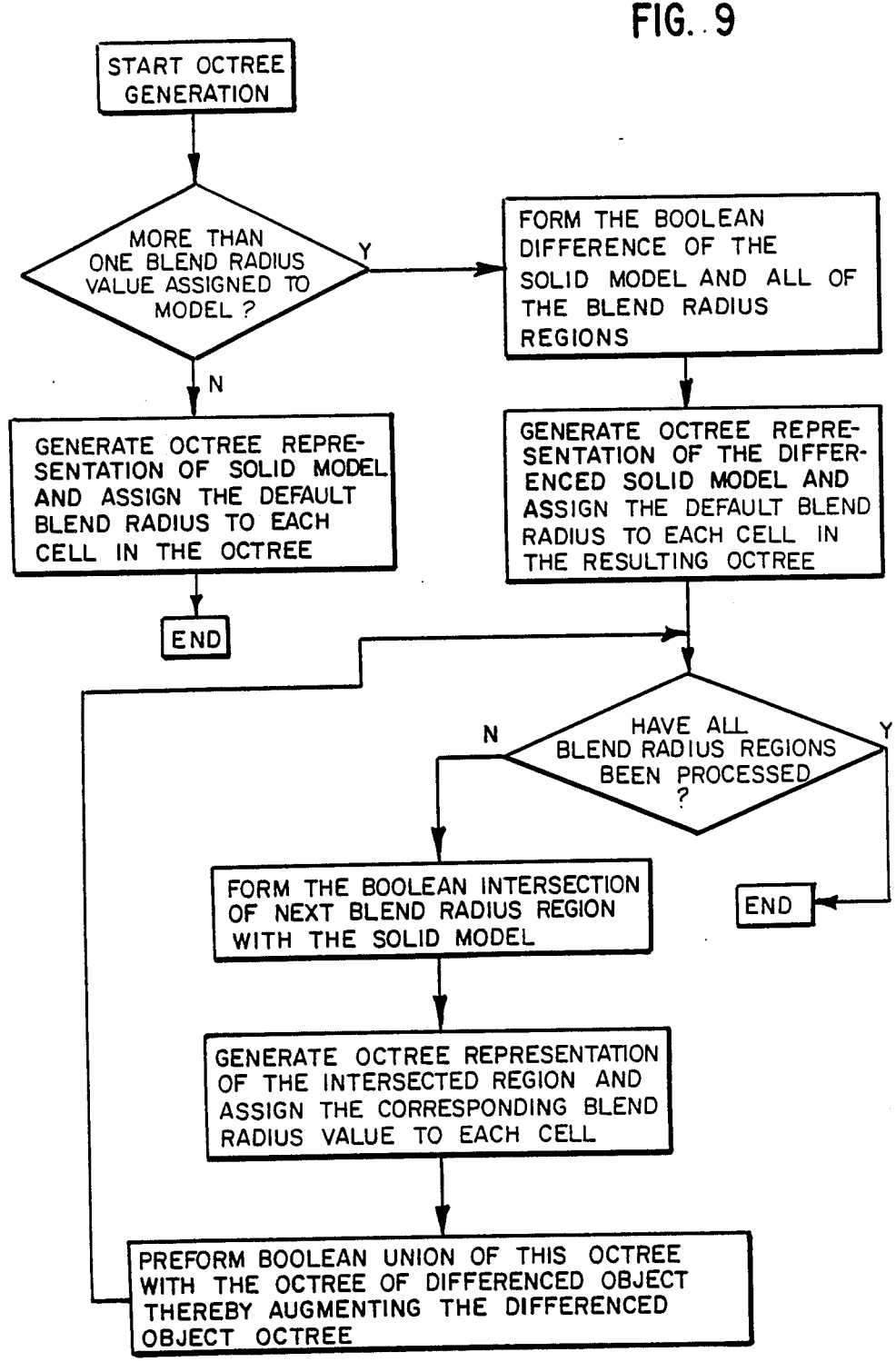
FIG. 9 illustrates a flow chart representation of an embodiment of a portion of the software.

A plurality of different blend radius values is more common and requires a more complicated approach as illustrated in FIG. 9. The boolean difference of the model and all of the blend radius regions is formed to define that portion of the model which has been assigned the default blend radius value. An octree representation of this portion of the model is generated and a default blend radius value is assigned to each of these cells. This approach allows the operator sufficient flexibility to define one of the desired blend radius values as the default value, such that any unassigned areas are automatically blended to the default value. For example, the operator selects the largest area having a common blend radius value as the default. Thus, during the modeling phase the operator need not assign a blend radius value to each area, but may rely on the default value.

The program continues by generating the octree representation of each blend radius region until all of the regions have been processed. The boolean intersection of each blend radius region and the solid model are successively formed until the model is completely defined. The octree representation of each region is formed and the blend radius value is assigned to each cell. Subsequent to each boolean intersection, the boolean union of the current octree and the octree of the default region is formed to successively augment the object octree.

The basic octree is complete and control is returned to FIG. 8 where weighting factors are assigned to each of the boundary octree cells by the Monte Carlo method previously described.

Figure 10:
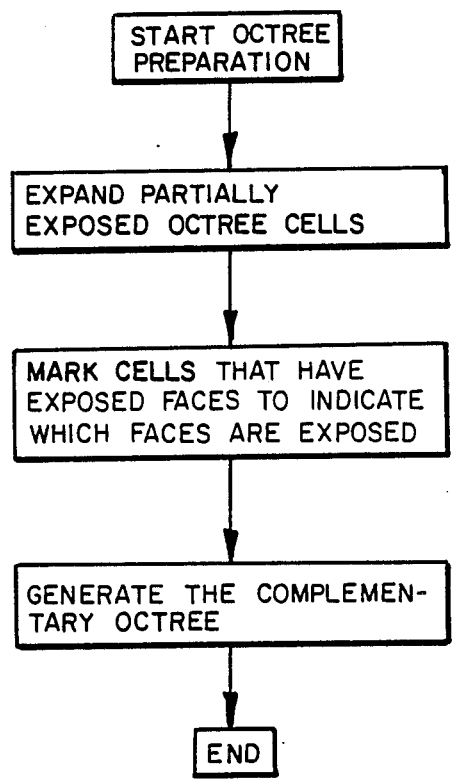
FIG. 10 illustrates a flow chart representation of an embodiment of a portion of the software.

Further refining of the octree as prepatory for boundary evaluation is generally described in FIG. 8 with the detailed steps being identified in FIG. 10. The process includes identifying any boundary cells with partially exposed surfaces. As previously discussed, these cells are recursively subdivided until all of the boundary cells have surfaces which are fully exposed. The program continues by marking the exposed surfaces of the boundary cells for later use in weighting the complementary octree boundary cells.

Figure 11:
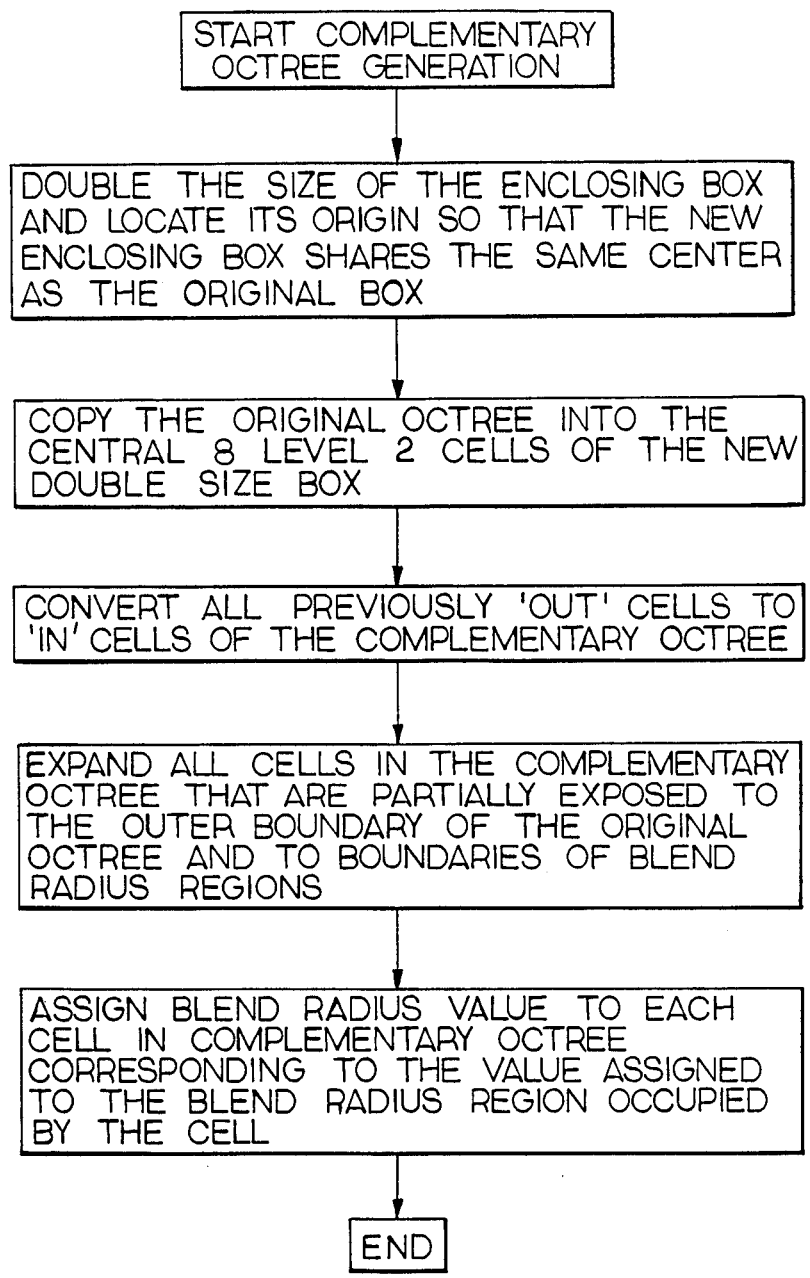
FIG. 11 illustrates a flow chart representation of an embodiment of a portion of the software.

The final step in generating the completed octree representation involves creating the complementary octree according to the process illustrated in FIG. 11. The original octree cell which enclosed the entire model is initially doubled in size and centered about its original center. The cells previously discarded by the octree generation as completely outside the solid model are revived and designated as inside the complementary octree. As during the octree generation, all of the complementary cells which have surfaces partially exposed to the octree cells are recursively subdivided until only fully exposed complementary surfaces remain. Further, all of the complementary cells which span contiguous blending radius regions having different blend radius values are likewise further subdivided and are assigned a blend radius value corresponding to the value assigned to the blend radius region occupied by each cell. Thus, generation of the octree is complete and control returns to FIG. 8.

Figure 12:
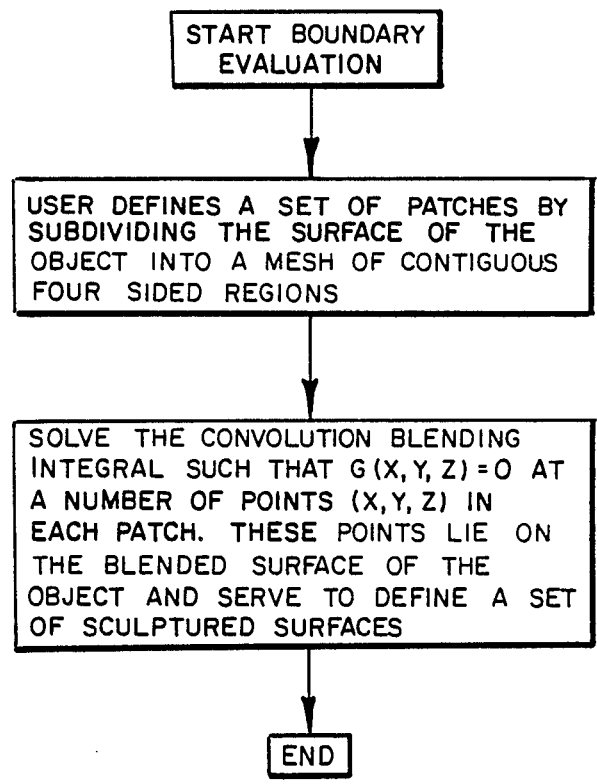
FIG. 12 illustrates a flow chart representation of an embodiment of a portion of the software.
Figure 13:
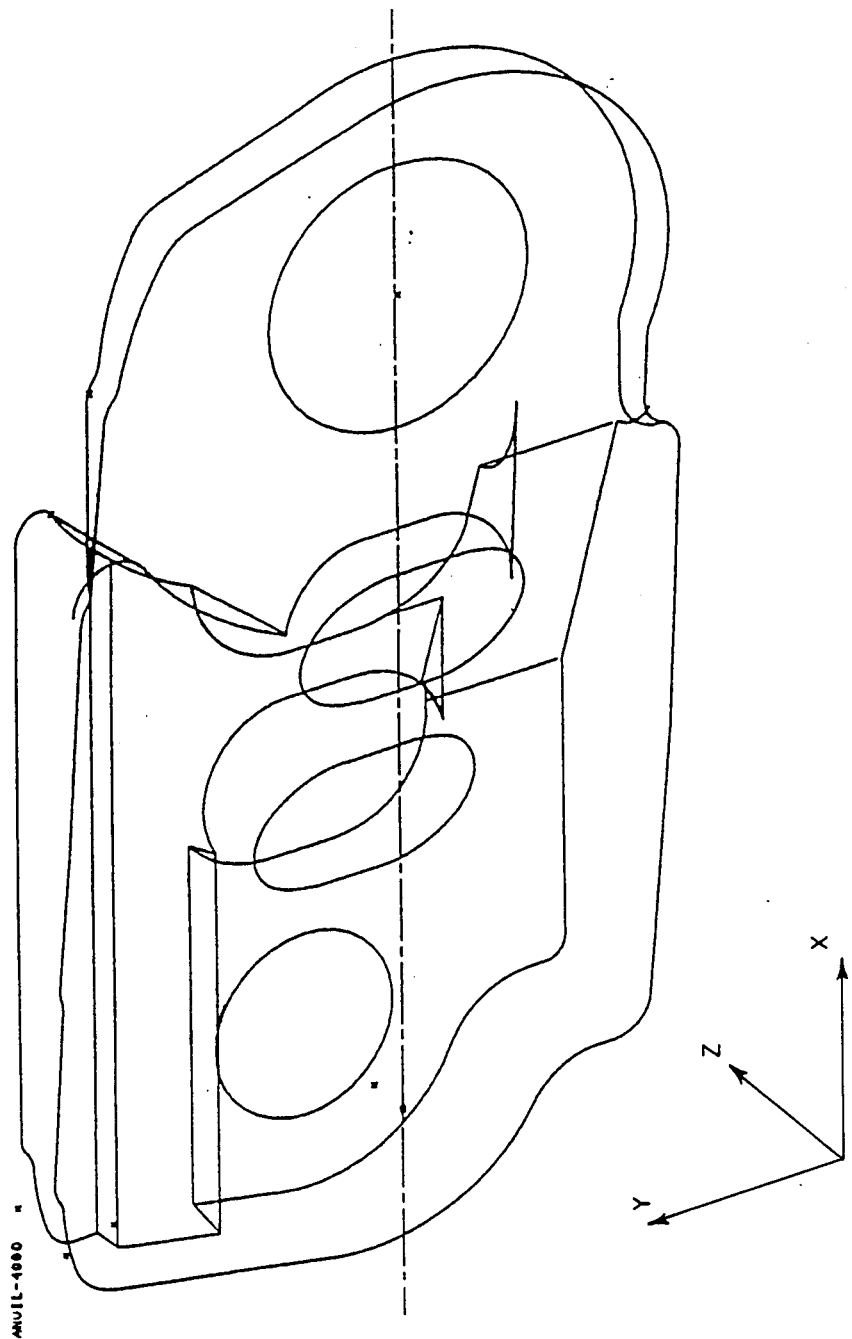
FIG. 13 illustrates an unblended three dimensional model of a track link forging die cavity.
Figure 14:
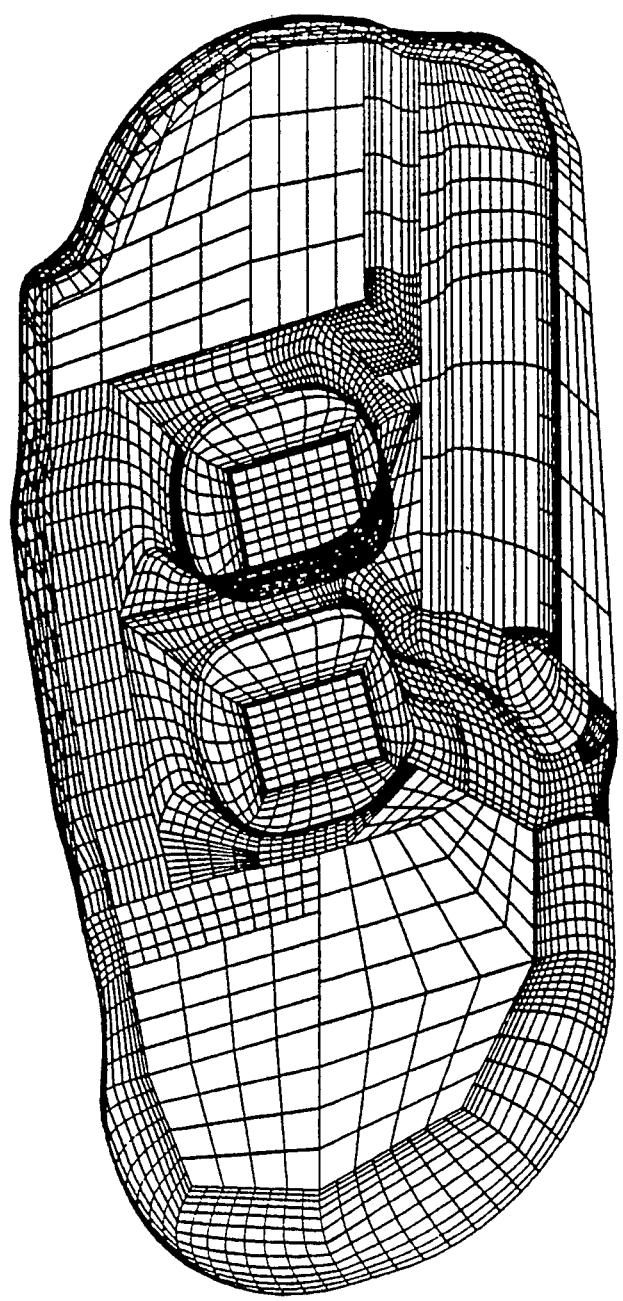
FIG. 14 illustrates a blended three dimensional model of a track link forging die cavity.

The final step in the global blending process of FIG. 8 includes evaluating the boundary of the blended object by applying the convolution integral global blending method. Referring to FIG. 12, the process involves the final operator interface with the blending program where the plurality of rays are defined for use in the ray tracing solution to the convolution integral. The operator manually defines the patches and the number of desired rays within the patch. The program then defines each of the rays so as to evenly distribute the requested rays within each patch.

Once the rays have been properly defined then the program begins to solve the convolution integral for the point at which each defined ray intersects the blended solid model surface. The blending radius value and weight of the cell being evaluated is substituted into the equation:

$$g_{cube} = H_x H_y H_z$$

the coordinates of the center of each cell $(x_{ci}, y_{ci}, z_{ci})$ and one-half the cell dimension $s_i$ are similarly substituted into the equation. The numeric solution for each of the cells within a preselected distance of the evaluation point is computed and summed. The location of the evaluation point is successively adjusted until the numeric solutions sum to the value zero. This evaluation point is a point on the surface of the blended object. The process repeats for each ray further defining the blended surfaces until all of the rays have been successfully traced and solved. At this time, the solution points for each ray define the blended surface of the solid model and the global blending process is complete.

Upon completion of the solution for all of the user defined rays, a set of accurately reproduced blended surfaces are defined. These surfaces are then usable in the top level view of FIG. 7 by the Anvil-4000 program for generating the machine tool paths or other applications.

INDUSTRIAL APPLICABILITY

In the overall operation of the global blending process, the system begins with a standard geometric modeling program. An operator initially designs a solid model representation of a piece part. The part is dimensionally accurate with highly defined surfaces and simple sharp edges. The operator is also required to input the desired blend radius values for each region and to define the rays for the ray tracing technique.

Subsequent operator intervention is not required. The global blending software utilizes the operator prepared information to generate an octree and complementary octree representation of the piece part. The weighting system is then employed to enhance the accuracy of the blended model. The majority of the processing time is consumed in the repeated ray tracing solution to the convolution integral. For example, a VAX model 11/785 exclusively operating the global blending software upon the solid model of the track link forging of FIG. 9 required approximately 48 hours of CPU time to produce the blended surface model of FIG. 10. This can be compared to a similar exercise wherein an experienced operator created a tracklink model using the traditional construction techniques and local blending on ANVIL-4000. The elapsed time was about 3 months, while the CPU time expended was comparable to that required by the global blending system.

We claim:

1. A method for generating a set of blended surfaces for a computer representation of a solid model having a set of curvilinear surfaces, comprising the steps of:
    offsetting the curved surfaces of the solid model;
    generating an octree representation of the solid model;
    generating a complementary octree representation of the volume outside the solid model;
    assigning blend radius values to each individual cell of the octree;
    defining a plurality of rays substantially normal to and intersecting the solid model surface;
    repetitively solving a convolution integral in an iterative manner at a plurality of locations along each ray, wherein the convolution integral includes a gaussian sphere blending factor with a size responsive to the blend radius assigned to the octree cell;
    storing the location on each ray at which the solution of the convolution integral is equal to a preselected value, said stored locations defining the set of blended surfaces of the solid model.

2. A method, as set forth in claim 1, wherein the step of generating the octree includes the step of repetitively subdividing each cell which has a partially exposed surface.

3. A method, as set forth in claim 1, including the step of assigning a weighting factor to each boundary cell of the octree using a Monte Carlo method.

4. A method, as set forth in claim 3, including the step of altering the stored locations respectively responsive to the weighting factor assigned to the boundary cell intersecting each ray.

5. A method, as set forth in claim 3, including the step of altering the size of each boundary cell of the octree responsive to the respective weighting factor.

6. A method, as set forth in claim 5, wherein the step of altering the size of each boundary cell includes altering only the octree cells which have at least one surface in common with the complementary octree by moving each common surface in a direction toward the opposite parallel surface of the octree cell a distance responsive to the assigned weighting factor.

7. A method, as set forth in claim 5, wherein the step of altering the size of boundary cells includes altering only the octree cells which have no surfaces in common with the complementary octree by uniformly reducing the volume of the cell about the center of the cell correlative to the assigned weighting factor.

8. A method, as set forth in claim 1, wherein the step of solving the convolution integral includes the steps of solving the integral for each cell within a preselected distance of the center of the blending sphere using each cell volume as the limits of integration and summing the solution for each cell.

9. The method, as set forth in claim 1, further comprising the step of:
    utilizing said stored locations for generating a plurality of machine tool paths corresponding to the blended surface.

10. A method for generating a set of blended surfaces for a computer representation of a solid model having a set of curvilinear surfaces, comprising the steps of:
    assigning a blend radius to the solid model;
    offsetting the curved surfaces of the solid model;

defining a plurality of rays substantially normal to and intersecting the solid model surface;

repetitively solving a convolution integral in an iterative manner at a plurality of locations along each ray, wherein the convolution integral includes a hard sphere blending factor with a radius equal to the blend radius assigned to the solid model; and storing the location on each ray at which the convolution integral is equal to a preselected value, said stored locations defining the set of blended surfaces of the solid model.

11. A method, as set forth in claim 9, wherein the step of solving the convolution integral includes the steps of forming the difference between the volumes of the intersection of the blending sphere with the solid model, and the intersection of the blending sphere with the complement of the solid model.

12. a method for generating a set of blended surfaces for a computer representation of a solid model comprising the steps of:

representing the solid model as a set of geometric cells;

defining a plurality of rays substantially normal to and intersecting the solid model surface;

assigning blend radius values to cells which a ray intersects;

repetitively solving a convolution integral in an iterative manner at a plurality of locations along each ray, wherein the convolution integral includes a blending factor with a size responsive to the blend radius assigned to the cell intersecting the ray; and storing the location on each ray at which the convolution integral is equal to a preselected value, said stored locations defining the set of blended surfaces of the solid model.

13. The method, as set forth in claim 12, including the step of assigning a weighting factor to each boundary cell intersecting a ray using a Monte Carlo method.

14. The method, as set forth in claim 13, including the step of altering the stored locations respectively responsive to the weighting factor assigned to the boundary cell intersecting each ray.

15. The method, as set forth in claim 13, including the step of altering the size of each boundary cell intersecting a ray responsive to the respective weighting factor.

16. The method, as set forth in claim 15, wherein the step of altering the size of each boundary cell includes altering only the cells which have at least one exposed surface by moving each exposed surface in a direction toward the opposite parallel surface a distance responsive to the assigned weighting factor.

17. The method, as set forth in claim 15, wherein the step of altering the size of boundary cells includes altering only the cells intersecting a ray which have no exposed surfaces by uniformly reducing the volume of the cell about the center of the cell correlative to the assigned weighting factor.

18. The method, as set forth in claim 12, wherein the step of solving the convolution integral includes the steps of solving the integral for each cell within a preselected distance of the center of the ellipsoidal term using each cell volume as the limits of integration and summing the solution for each cell.

19. The method, as set forth in claim 12, further comprising the step of:

utilizing said stored locations for generating a plurality of machine tool paths corresponding to the blended surface.

* * * * *

UNITED STATES PATENT AND TRADEMARK OFFICE
CERTIFICATE OF CORRECTION

PATENT NO. : 4,791,583
DATED : December 13, 1988
INVENTOR(S) : Stephen Colburn

It is certified that error appears in the above-identified patent and that said Letters Patent is hereby corrected as shown below:

Claim 11, line 1, "claim 9" should be --claim 10--.

Signed and Sealed this

Sixth Day of June, 1989

Attest:

DONALD J. QUIGG

Attesting Officer

Commissioner of Patents and Trademarks